May 27, 1930.  H. E. MARVEL  1,760,510
SPRAYING APPARATUS FOR RAG CATCHERS
Filed June 3, 1927  3 Sheets-Sheet 1
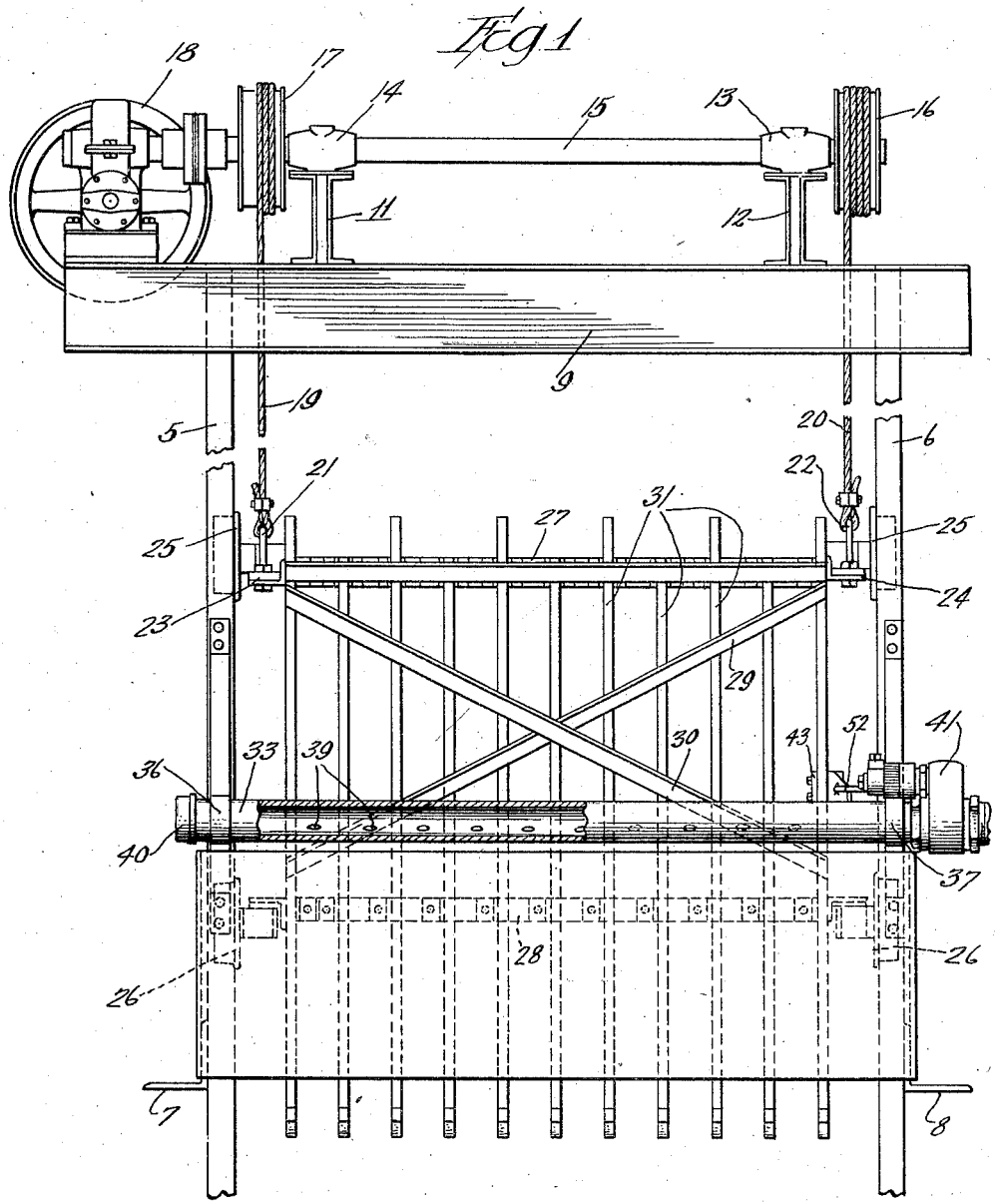

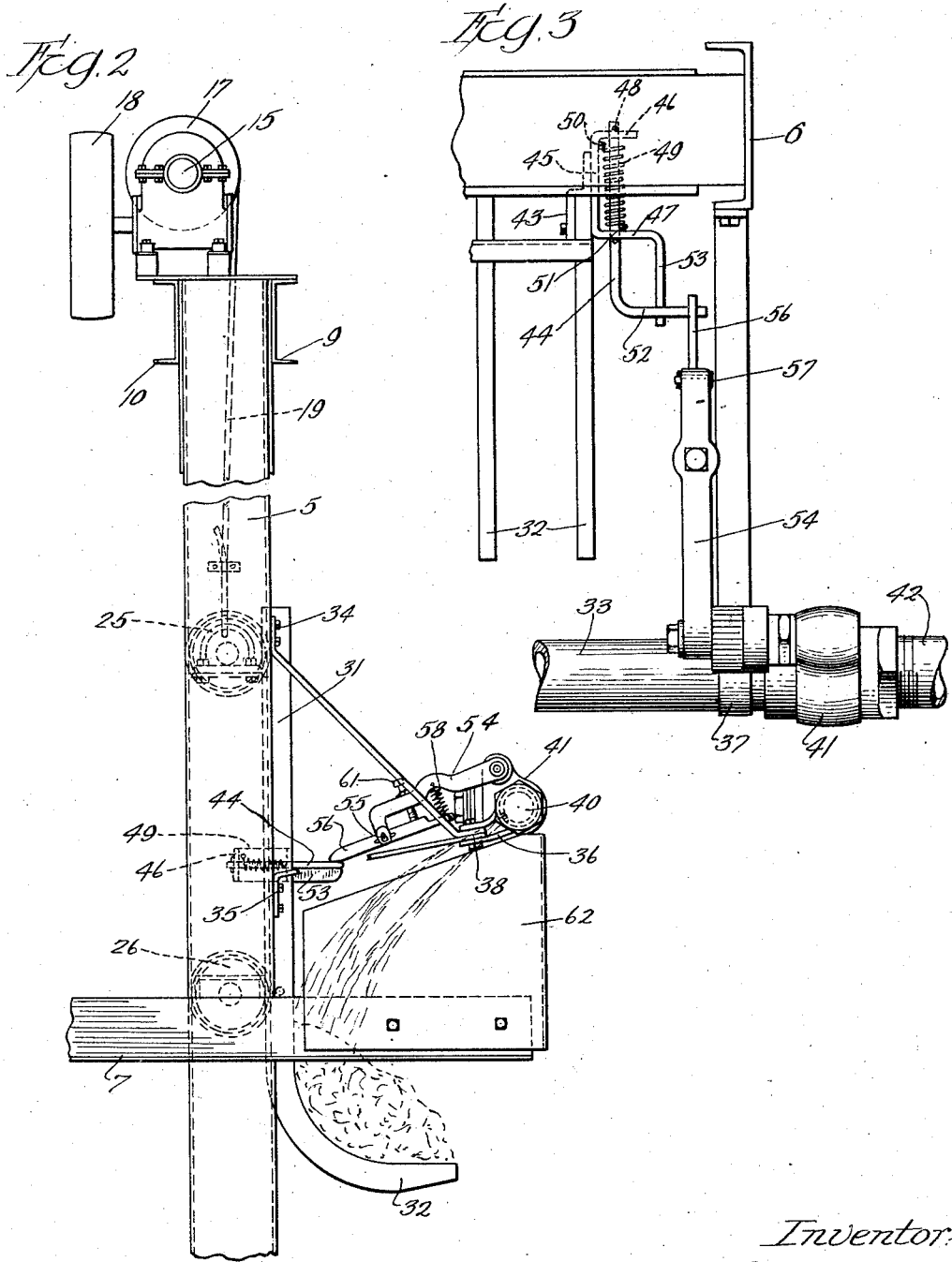

May 27, 1930.  H. E. MARVEL  1,760,510
SPRAYING APPARATUS FOR RAG CATCHERS
Filed June 3, 1927     3 Sheets-Sheet 3
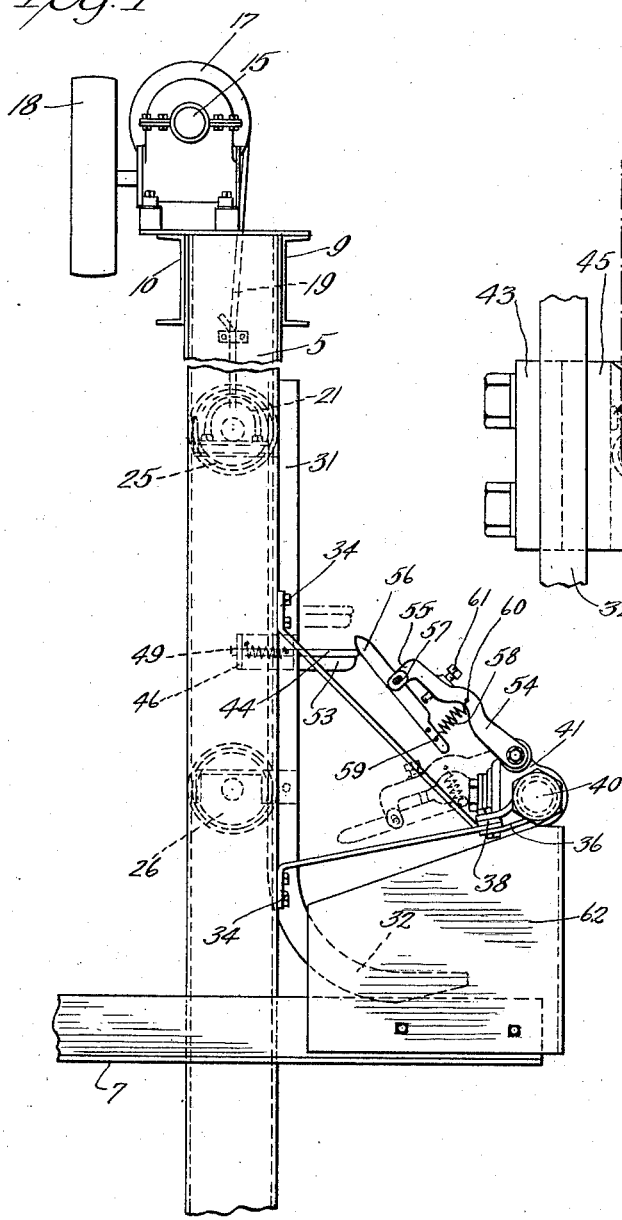
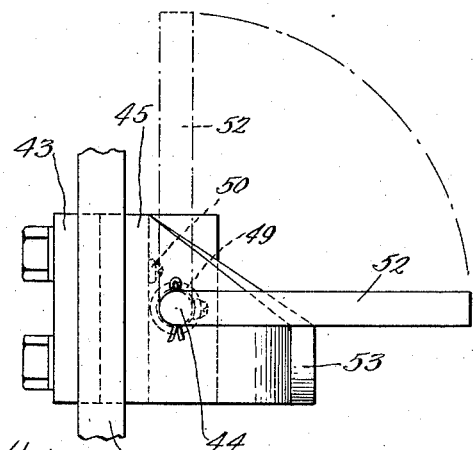
Inventor.
Harvey E. Marvel
By Nissen & Crane
Attys.

Patented May 27, 1930

1,760,510

UNITED STATES PATENT OFFICE

HARVEY E. MARVEL, OF FORT WAYNE, INDIANA, ASSIGNOR TO S. F. BOWSER & COMPANY, INC., OF FORT WAYNE, INDIANA, A CORPORATION OF INDIANA

SPRAYING APPARATUS FOR RAG CATCHERS

Application filed June 3, 1927. Serial No. 196,178.

My invention relates in general to rag catchers as used in combination with rag beaters in paper fabrication and has particular reference to a spraying apparatus for washing the pulp from rags, strings, etc., as the pulp is raised out of the beater by the rag catcher.

One of the principal objects of the invention is to accomplish automatically what has heretofore been done by individuals with the use of a hose.

A further object of the invention is to provide a spraying apparatus which may be applied to a rag catcher without in any way disturbing the rag catcher assembly or interfering in any manner whatsoever with its operation and to so construct the spraying apparatus that it will be automatically actuated at desired stages in the operation of the rag catcher.

A still further object of the invention is to provide a spraying apparatus of the class described which may be assembled with the rag catcher as an attachment therefor with the spraying apparatus so constructed that it is applicable to existing rag catchers which will thus permit the same to be applied to those rag catchers which are already in use.

A still further object of the invention is to provide a spraying apparatus for a rag catcher which may be produced at a reasonable manufacturing cost; which may be conveniently applied to a rag catcher as an attachment therefor; which will be positive in operation; and capable of otherwise carrying out its intended use with the greatest of efficiency.

For the purpose of illustrating the salient features of the invention, a practical embodiment thereof is shown in the accompanying drawings in which:

Fig. 1 is a view in front elevation of a rag catcher with my improved spraying apparatus applied thereto;

Fig. 2 is a view in side elevation of a rag catcher with my spraying device applied thereto;

Fig. 3 is a plan view in detail showing the co-operative relationship between the quick-acting valve for the spraying apparatus and the actuating means therefor;

Fig. 4 is a view similar to Fig. 2 but showing the parts of the rag catcher and spraying apparatus in an elevated position with respect to the position of the same parts shown in Fig. 2;

Fig. 5 is a detail view in front elevation of the valve actuating or tripping mechanism.

Referring now to the drawings in detail, the rag catcher preferably embodies in its construction two upright channel members 5 and 6, the lower ends of which being adapted to project into the beater tub, with angle irons 7 and 8 on the members 5 and 6 providing ledges for resting upon the top of the beater tub. The upright members 5 and 6 are connected at the top by channel members 9 and 10 which also provide a supporting base for mounting the supports 11 and 12 for the journal bearings 13 and 14. The shaft 15 is mounted in the bearings 13 and 14 with freedom of rotation therein and carries adjacent its respective ends flanged cable or the like drums 16 and 17. The end of the shaft 15 in advance of the drum 17 is connected through the medium of a suitable reduction gearing in driving relation with the belt pulley 18 so as to impart rotation to the shaft 15 for, in turn, rotating the cable drums 16 and 17, which are keyed to the shaft. Wound around the drums 16 and 17 are cables 19 and 20, the unwound ends thereof being secured to the carriage of the rag catcher by U-bolts or the like 21 and 22 which are, in turn, bolted to the outwardly projecting ears 23 and 24 of the carriage frame. The rag catcher carriage is equipped with two sets of flanged wheels, one set 25 at the top of the carriage and the other set 26 at the bottom of the carriage. The wheels are mounted to the sides of the carriage and are confined in the channels of the upright members 5 and 6. The channels of the upright members 5 and 6 in this respect provide tracks for the wheels so that the rag catcher carriage may be elevated and lowered by the cables 19 and 20. It is, of course, understood that the drive for the shaft 15 rotates the shaft and the cable drums 16 and 17 in one direction to unwind the cables and lower the carriage and in an opposite direction for winding the cables on the drums for elevating the carriage.

The rag catcher carriage for the most part is constructed with two horizontal bracing members 27 and 28 and a pair of diagonal angle braces 29 and 30. The horizontal members 27 and 28 serve as a mounting for a series of vertical rag catcher fingers or tines 31. The fingers or tines in this respect being mounted to the horizontal members and spaced in fixed relation and the diagonal bracing members 29 and 30 serve to add rigidity to the structure and their respective ends are preferably secured for this purpose to the end ones of the series of fingers or tines. The mounting which connects the carriage to the wheels 25 and 26 is so arranged as to support the carriage to the front of the members 5 and 6 but the carriage does not project to any material extent in advance of the members so that in reality it is mounted to be elevated and lowered between the members.

The curved ends 32 of the fingers 31 project outwardly at the lower end of the carriage, as clearly shown in Figs. 2 and 4.

The foregoing description will serve to explain the construction of the rag catcher and it is, of course, understood that the carriage is intended to be elevated and lowered in the beater tub with the curved ends of the fingers collecting and picking up a quantity of the material in the beater so that it may be removed from the beater.

As previously explained, when the material has been elevated from the beater, it has been the customary practice to wash the same prior to its removal from the rag catcher. I propose to perform this same step by automatically washing the material with the aid of a spraying apparatus with which the rag catcher is equipped. To this end, I prefer to employ a horizontal spray pipe 33 which is mounted across the upright members 5 and 6 by suitable strap brackets 36 and 37. The ends of the brackets will be bolted as at 34 and 35 to each of the members 5 and 6 and projecting in front of the members for connecting and supporting the straps 36 and 37 which encircle the spray pipe 33 adjacent its ends. The ends of the straps 36 and 37 may be secured to the bracket part of the mounting by interfitting connections, bolting them together as at 38. In this way, I can mount the spray pipe 33 in front of the rag catcher in a position suitable for its intended purpopse.

The spray pipe is provided with a series of horizontally spaced spray openings 39 in the lower circumference of the pipe and facing the rag catcher. The pipe 33 is closed by a cap 40 at one end, with its opposite end equipped with a quick-acting valve 41, which, in turn, communicates with a water supply pipe 42. The valve 41 is of conventional construction and almost any valve which is quick-acting and capable of being actuated by the mechanism to be presently described will serve the purpose.

Mounted to the rag catcher carriage at one side thereof by the bracket 43, is a tripping mechanism for actuating the valve 41. This mechanism preferably comprises an arm 44. The mounting for the arm comprises a plate 45 which is bolted or otherwise secured to the bracket mounting 43 with upstanding flanges 46 and 47 at the opposite ends of the plate with openings in these flanges through which the arm 44 projects. A cotter pin 48 on the end of the arm which projects through the flange 46 prevents withdrawal of the arm from the opening in the flanges and at the same time permitting the arm to rock or oscillate with respect to its mounting. Confined between the flanges 46 and 47 of the mounting 45 and coiled around the arm 44 is a spiral spring 49. One end of the spring is secured as at 50 to the mounting plate 45 and the opposite end of the spring is secured as at 51 to the arm 44. The influence of this spring holds the deflected end 52 of the arm across the outwardly projecting extension 53 of the mounting plate 45. The projection 53 in this respect acting in the capacity of a stop for the arm so that it is only free to rock or oscillate in one direction and only then against the influence of the spring 49. Pivotally connected to the manipulating stem of the valve 41 is an arm 54, the downwardly depending end 55 thereof carrying a finger 56. The finger 56 is pivotally connected intermediate its ends, as at 57, to the arm 54 and a spring 58 is connected, as at 59, to the end of the finger with its other end connected, as at 60, to the arm. The arm is also provided with a stop 61 comprising a bolt threaded through the arm with its end terminating in arresting relation with the finger 56.

When the rag catcher carriage occupies a position within the beater tub, the valve 41 is of course closed and the finger 56 of the actuating mechanism therefore assumes a downwardly slanting position, so to speak, out of contact with the arm 52. The arm 52 is positioned on the rag catcher carriage below the finger 56 but projects in advance of the carriage in position to contact with the finger 56 when the carriage is elevated. Upon elevating the rag catcher carriage, the arm 52 will abut the finger 51 and just as soon as the influence of the spring 58, is overcome, the arm 52 will commence to raise the arm 54 on the valve and thus place the spraying apparatus in operation. The material carried by the fingers of the rag catcher will thus be sprayed and the spraying operation will continue so long as the finger 56 is under the influence of the arm 52, or, in other words, until the rag catcher carriage is elevated to its highest position. During this elevating operation, the material carried by the rag catcher carriage is being moved gradually toward the spray so that the material is subjected to the full force of the spray when the carriage is at the limit of its elevated position. A thorough drenching and washing of the material is thus accomplished. At the limit of the elevated position of the rag catcher carriage, the arm 52 rides under the finger 56 and releases the same so that the arm 54 is free to return to its normal position, closing the valve. The drop of the arm 54 is cushioned by the gradual closing of the valve against the water pressure.

Upon lowering the rag catcher carriage, the arm 52 will be above the finger 56 but the stop 61 for the finger 56 will resist any movement of the finger downwardly. Consequently, when the arm 52 contacts with the top of the finger, the influence of the spring 49 will be overcome, permitting the arm to oscillate or move upwardly with a wiping contact on top of the finger 56 just as soon as as it passes the obstruction offered by the finger 56, it will snap under the finger and come to rest upon the stop 53, the spring 49 returning it to its normal position after it has wiped past the finger.

In order to control the spray and assure full force and effect of the same on the material carried by the rag catcher carriage, I prefer to use a sheet metal box-like structure 62 around the spray. This protection may be arranged by mounting a three-sided inclosure upon the angle irons 7 and 8 on the side of the members 5 and 6.

From the above description, it will be readily seen that the spraying apparatus will operate automatically without attention as the rags are raised up by the rag catcher carriage. After they have been elevated to a certain position, the valve again automatically closes. After the rags have been dumped from the rag catcher carriage, the same is free to be again lowered into the beater without in any way disturbing the valve. The sheet metal housing around three sides of the assembly allows the use of a large quantity of water for spraying purposes and directs all the water that is used into the beater.

The rag catcher which I have herein selected for illustrating the salient features of my novel spraying apparatus is the same as that shown and described in my co-pending case filed June 3, 1927, Serial No. 196,177. In said co-pending case, I have shown the rag catcher equipped with an unloading apparatus and I wish to explain here that the spraying apparatus in this case may be used to the same advantage whether or not the rag catcher is equipped with an unloading apparatus. The operation of one does not in any way interfere with the other. Often it will be desirable to use both an unloading apparatus and a spraying apparatus on the same rag catcher.

Obviously those skilled in the art may make various changes in the details and arrangement of parts without departing from the spirit and scope of the invention as defined by the claims hereto appended and I wish therefore not to be restricted to the precise construction herein described.

I claim:—

1. In combination, a rag catcher of the class described having a carriage mounted to be lowered into and raised from a beater for removing material therefrom, and means for automatically spraying the material as it is removed from the beater by said carriage comprising a spray device, a normally closed control valve therefor, and tripping mechanism actuated by said carriage for opening the valve when the carriage is elevated.

2. In combination, a rag catcher of the class described having a carriage mounted to be lowered into and raised from a beater for removing material therefrom, and means associated with the rag catcher for automatically spraying the material as it is removed from the beater by said carriage comprising a spray device, a valve therefor, and means for opening the valve comprising a vertically rotatable arm, a finger carried by said arm, and tripping means on the rag catcher carriage for engaging said finger and elevating said arm, said tripping means being mounted to ride past the finger at the limit of elevation of the arm whereby the arm is released so as to return to its lowered position closing the valve.

3. An apparatus for spraying rags over a beater tub comprising means for removing the rags from the beater tub and a spray device automatically operated by said rag removing means, comprising a spray pipe communicating with a source of water supply, a valve for said pipe, and means for opening the valve when the rags are removed from the beater tub comprising an arm connected with the valve and mounted to swing from a lowered valve closing position into an elevated valve opening position, and a tripping mechanism carried by the rag removing means for elevating said arm into an elevated valve opening position and automatically releasing the same at the limit of its elevation.

4. A spraying apparatus for rag catchers comprising a perforated pipe closed at one end with the opposite end equipped for communication with a source of water supply, a valve for said pipe, and means for opening and closing said valve comprising an arm mounted to swing into an elevated position, said arm being connected to the valve at one end, a finger pivotally connected to the opposite end of said arm, a stop on the arm for limiting the pivoted movement of the finger in one direction, means for holding the finger against said stop, said finger projecting in advance of the arm to intercept means on a rag catcher carriage whereby movement of said carriage in a direction in which the said arm is mounted to swing will raise the arm and open said valve.

5. In apparatus of the class described, a frame structure arranged to be supported over a beater tub, a material handling carriage mounted to travel on said frame structure for removing material from the beater tub, and means for spraying the material as it is thus removed from said tub, comprising a spraying device, brackets supporting said device in extended position on the front of the said frame structure, a control valve for the spraying device, and means for actuating said valve by the rag catcher carriage, comprising means connected to the valve and projecting therefrom in the direction of the rag catcher carriage and constructed to intercept a lifting device on said carriage; whereby the valve will be opened by the rag catcher carriage as said carriage is elevated out of the beater tub.

6. The combination with a rag catcher comprising a frame structure and a carriage mounted thereon for support over a beater tub and means for raising and lowering the carriage relatively to the beater tub for collecting and removing material contained therein, of means for spraying material with water when such material is being removed from the tub by said carriage, said spraying means comprising a spray pipe extending across the front of the frame structure of the rag catcher, a control valve for said pipe, means for opening said valve, and mechanism actuated by the rag catcher carriage while being elevated out of the beater tub to operate said opening means.

7. The combination with a rag catcher comprising a frame structure with a carriage mounted thereon to reciprocate vertically to remove material from a beater tub on which the rag catcher is mounted, of means for spraying the material with water when the same is being removed from the tub by said carriage, said spraying means comprising a spray pipe extending across the front of the frame structure of the rag catcher, a control valve for said pipe, means for opening said valve comprising an actuating arm mounted to swing from a lower valve closing position to a raised valve opening position, and means on the rag catcher carriage adapted to intercept said arm when said carriage is elevated and move such arm to its valve opening position to effect the operation of said spraying means.

8. In apparatus of the class described, a frame structure arranged to be supported over a beater tub, a carriage mounted on said frame structure, means for raising and lowering said carriage relatively to the beater tub for collecting and removing material contained therein, means for spraying the material with a water spray when the same is removed from the tub by said carriage comprising a spray pipe supported across the front of the frame structure of the rag catcher, a control valve for said pipe, means for opening the valve when said rag catcher carriage is elevated out of the beater tub, comprising an actuating arm for said valve, said arm being mounted to swing from a lowered valve closing position into a raised valve opening position, and means on the rag catcher carriage adapted to intercept the arm when said carriage is elevated and move the same to its raised position, comprising a tripping mechanism arranged for releasing the arm at the limit of its raised position permitting the arm to return to its lowered valve closing position comprising a pivoted finger on the actuating arm for the valve constructed to ride over the means on the rag catcher carriage which lifts the arm.

9. In apparatus of the class described, a frame structure arranged to be supported over a beater tub, a carriage mounted on said frame structure, means for raising and lowering said carriage relatively to the beater tub for collecting and removing material contained therein, means for spraying the material with a water spray when the same is removed from the tub by said carriage comprising a spray pipe supported across the front of the frame structure of the rag catcher, a control valve for said pipe, means for opening said valve when the rag catcher carriage is elevated out of the beater tub comprising an actuating arm for said valve, said arm being mounted to swing from a lowered valve closing position into a raised valve opening position, a pivoted trip finger on the end of the arm, and means on the rag catcher carriage adapted to intercept said trip finger when said carriage is elevated to raise the arm to open said valve, comprising a rotatable lifting arm mounted to project in front of the rag catcher carriage, a stop for limiting rotation of the arm in one direction, a spring for resisting rotation of the arm in the opposite direction, said trip finger on the valve actuating arm adapted to ride under the lifting arm on the rag catcher carriage when the valve actuating arm has been raised to the limit of its elevated position; whereby the valve actuating arm is free to return to its lowered valve closing position, and said lifting arm being adapted to ride under said trip finger when the rag catcher carriage is lowered into the beater tub.

In testimony whereof I have signed my name to this specification on this 31st day of May, A. D. 1927.

HARVEY E. MARVEL.